(12) United States Patent
Martin

(10) Patent No.: US 7,621,803 B2
(45) Date of Patent: *Nov. 24, 2009

(54) UTENSIL FOR OPENING A SHELL OF A CRUSTACEAN

(76) Inventor: Daniel M. Martin, 5135 Verdin St., Lafitte, LA (US) 70067

( * ) Notice: Subject to any disclaimer, the term of this patent is extended or adjusted under 35 U.S.C. 154(b) by 0 days.

This patent is subject to a terminal disclaimer.

(21) Appl. No.: 11/825,539

(22) Filed: Jul. 6, 2007

(65) Prior Publication Data

US 2008/0076340 A1 Mar. 27, 2008

Related U.S. Application Data

(63) Continuation-in-part of application No. 11/490,756, filed on Jul. 22, 2006, now Pat. No. 7,258,603.

(51) Int. Cl.
*A22C 29/02* (2006.01)

(52) U.S. Cl. .......................................................... 452/6

(58) Field of Classification Search ................ 30/90.1, 30/90.8, 90.4, 90.6, 120.1–120.5; 81/426, 81/426.5, 424.5, 418; 99/552, 553, 564, 99/581, 567, 568, 577, 578; 7/132, 134, 7/135; 452/1–17, 102–105

See application file for complete search history.

(56) References Cited

U.S. PATENT DOCUMENTS

| | | | |
|---|---|---|---|
| 753,048 A | 2/1904 | Des Moinaux | |
| 1,124,118 A * | 1/1915 | Elwell | 86/22 |
| 1,436,571 A * | 11/1922 | Bokor | 30/120.4 |
| 1,804,149 A * | 5/1931 | Clemens | 30/241 |
| 3,395,421 A * | 8/1968 | Harless, Jr. | 452/6 |
| 3,902,206 A * | 9/1975 | Naquin | 7/107 |
| 4,092,774 A * | 6/1978 | Watts | 30/92 |
| 4,607,544 A | 8/1986 | Jewell, Jr. | |
| 4,716,627 A | 1/1988 | Scott, Jr. | |
| 5,560,107 A * | 10/1996 | Herbert | 30/90.1 |
| 5,894,617 A | 4/1999 | Liou | |
| 6,202,517 B1 | 3/2001 | Dolan | |
| 6,588,039 B1 | 7/2003 | Bates | |
| 6,817,937 B1 * | 11/2004 | Merritt | 452/103 |
| 6,848,139 B2 | 2/2005 | Simon et al. | |
| 7,361,080 B2 * | 4/2008 | Martin | 452/6 |

* cited by examiner

Primary Examiner—Thomas Price
(74) Attorney, Agent, or Firm—Keaty Law Firm

(57) ABSTRACT

A utensil for opening a shell of a crustacean, such as crab, lobster and the like, has a pair of pivotally connected elongated members. Each elongate member has a handle portion and a head portion. A cutting blade is positioned in each of the head portions, the cutting blade having sharp inner edge to form a selected cut line through the shell of the crustacean. The cut line can be a uniformly straight line or defined by punctured openings that are made by serrated teeth provided on at least a portion of the cutting blade inner edge. The cutting blades are selectively brought in contact with the shelled crustacean positioned between the blades to sever the shell along a selected cut line without damaging the meat of the crustacean.

29 Claims, 5 Drawing Sheets

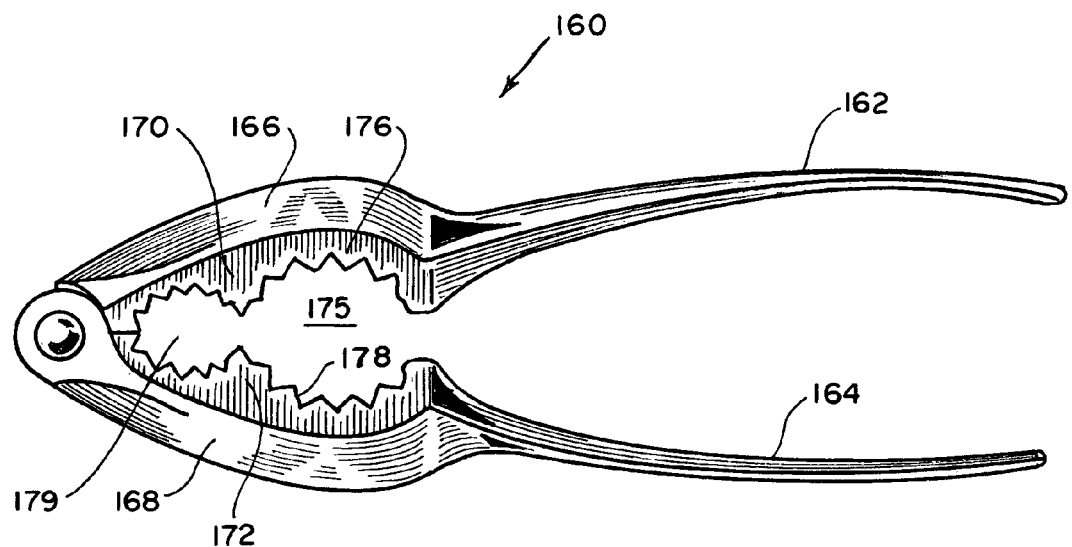
F I G. 7
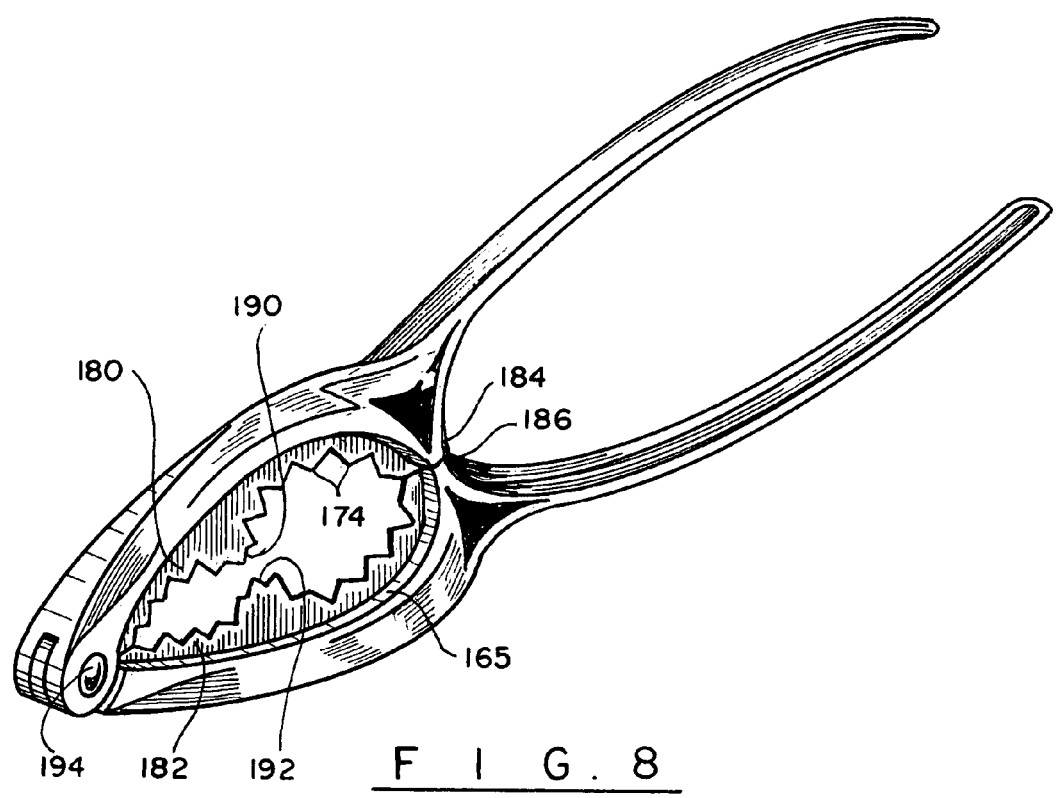
F I G. 8

UTENSIL FOR OPENING A SHELL OF A CRUSTACEAN

CROSS-REFERENCE TO RELATED APPLICATIONS

This application is a continuation-in-part of application Ser. No. 11/490,756 filed on Jul. 22, 2006, now U.S. Pat. No. 7,258,603, the full disclosure of which is incorporated by reference herein and priority of which is hereby claimed.

BACKGROUND OF THE INVENTION

This invention relates to a utensil for opening and removal of meat from crab legs or other types of shellfish. More particularly, this invention relates to a hand tool for severing the shell of a crab leg, lobster shell and the like.

Crabs, lobsters and other crustaceans are cooked in boiled water and often served in the shell. A person desiring to extract the meat of the crustacean must first crack the shell and then remove the meat for consumption. Conventionally, the diners use a pliers-type instrument that has a pair of lever arms joined pivotally at one end. A user places a leg of a crab or lobster between the lever arms and closes the lever arms, thereby crushing the shell. Since the crustacean shells have a variety of shapes and sizes, as well as the degree of brittleness, the shell and the meat are often crushed into small fragments that are not easy to separate. The user picks at the fragments, pulling small pieces of meat, which is frustrating and time-consuming.

An alternative is to use a fork for extracting the meat after the shell has been cracked, or even attempting to break the shell using the fork. This alternative is not very appealing since the sharp tines of the fork may pierce the user's skin if an excessive force is used on the crustacean's shell. In the case of snow crabs legs, the user may be further frustrated since the snow crab legs are relatively thin, soft when cooked and extracting meat from crushed legs is often difficult.

The present invention contemplates elimination of drawbacks associated with the prior art and provision of a hand-operated utensil that can open the shell of a crustacean without any substantial mechanical damage to the meat, while cutting through the shell with sharp serrated blades.

SUMMARY OF THE INVENTION

It is, therefore an object of the present invention to provide a utensil for opening a shell of crustacean.

It is another object of the present invention to provide a hand-held utensil for opening the crustacean's shell without causing any substantial damage to the meat contained in the shell.

These and other objects of the invention are achieved through a provision of a utensil, or device for opening a shell of a crustacean, which comprises a pair of elongated rigid members, each having a handle portion and a head portion unitary secured to the handle portion. The head portion has a proximal end where it is attached to the handle portion and a distal end. A pivot pin inserted through corresponding openings in the distal ends of the head portions pivotally secures the two elongated members together.

Each of the head portions has a concave inner surface provided with a groove. A cutting blade is detachably positioned within the groove. The cutting blade has a sharp inner edge for engaging the crustacean shell and cutting along the contact line. In some of the embodiments, the inner edge carries serrations on at least a part thereof, while in other embodiments, the sharp edge has a curved configuration. In one of the embodiments, the serrations extend along substantially entire length of the inner edge, while in other embodiments the cutting blade has a main concave part, a second concave part and an intermediate inwardly extending part. The main concave parts form a main opening for receiving a shelled crustacean therein. The secondary concave parts form a secondary opening for receiving a smaller size shelled crustacean. The serrated teeth can be formed along the blade edge in the first and second concave part or only in one of the concave parts.

In operation, a user places the shelled crustacean between the blades and pivots the handle portion and the head portion causing the cutting blade members to contact the shell of the crustacean and cut through the shell. The user manipulates the handles and the crustacean to execute a substantially straight cut along a selected cut line in the shell without damaging the meat in the shell.

BRIEF DESCRIPTION OF THE DRAWINGS

Reference will now be made to the drawings, wherein like parts are designated by like numerals, and wherein

FIG. 7 is a front view of the shell-opening utensil according to the fourth embodiment of the present invention in an open position.

FIG. 8 is a perspective view of the shell-opening utensil in accordance with the fourth embodiment of the present invention in a closed position.

DETAILED DESCRIPTION OF THE PREFERRED EMBODIMENT

Figure 1:
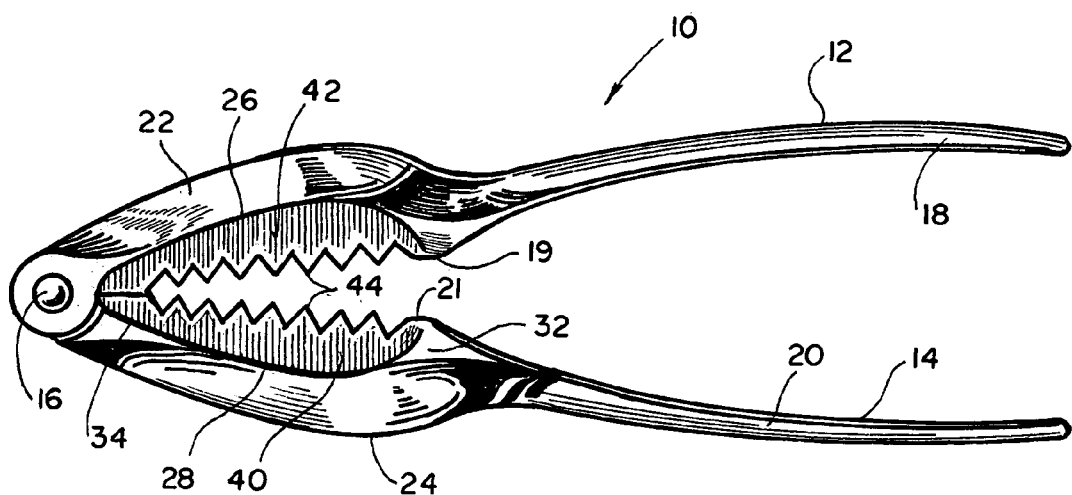
FIG. 1 is a perspective view of the shell-opening utensil according to the first embodiment of the present invention in an open position.

Turning now to the drawings in more detail, numeral 10 designates the utensil for opening the crustacean's shell according to the first embodiment of the present invention. The device 10 comprises a pair of pivotally connected, closely spaced, elongate members 12 and 14. Each elongate member 12 and 14 comprises a handle portion 18, 20, respectively, and a head portion 22. 24, respectively. The handle portions 18 and 20 are mirror images of each other and extend a distance from each other along a major part of the longitudinal extensions thereof. The handle portions 18 and 20 have inwardly extending handle parts 19, 21 that converge before joining with their respective head portions 22 and 24.

The head portions 22, 24 are integrally formed with their respective handle portions 12 and 14. A pivot pin 16 is inserted through corresponding openings formed in the head portions 22 and 24, thereby allowing pivotal movement between the elongate members 12 and 14.

The head portions 22, 24 are each provided with a concave inner surface 26, 28, respectively. A groove 30 is formed in the surface 28 extending from one end 32 to the second end 34 of the head portion 24. A similar groove is formed in the inner surface 26 of the head portion 22.

A cutting blade 40 is fitted in the groove 30, and a cutting blade 42 is fitted in the groove of the head portion 22. The mutually facing blades 40 and 42 are mirror images of each other. Each blade 40, 42 has inner edges, each of which carries a plurality sharpened serrations, or serrated teeth 44 that have their apexes directed toward a center of the area between the head portions 22. 24.

Figure 2:
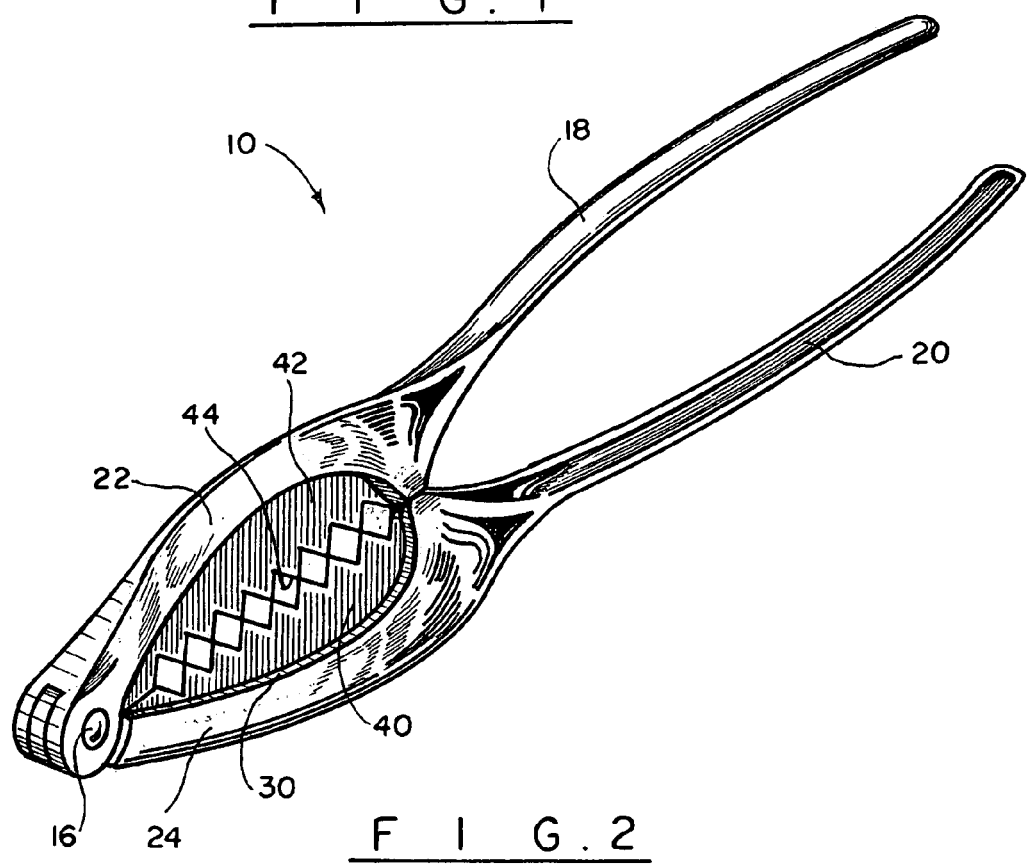
FIG. 2 is a perspective view of the shell-opening utensil in accordance with the first embodiment of the present invention in a closed position.

As can be seen in FIG. 2, the serrated teeth 44 of the blade 40 are generally aligned with the serrated teeth 44 of the blade 42 such that when the device 10 is in a closed position, the mutually facing teeth 44 touch the teeth of the opposing blade. In this embodiment, the teeth 44 are spaced along substantially entire length of the inner edges of the blades 40, 42. The teeth 44 facilitate cutting and breaking of the crustacean shell.

Figure 3:
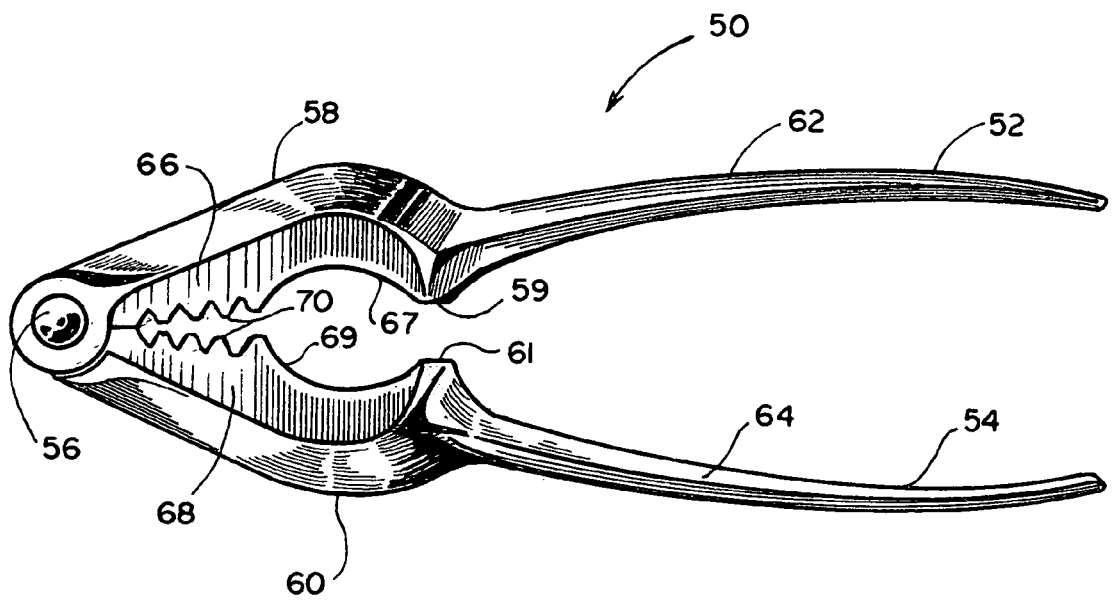
FIG. 3 is a perspective view of the shell-opening utensil according to the second embodiment of the present invention in an open position.
Figure 4:
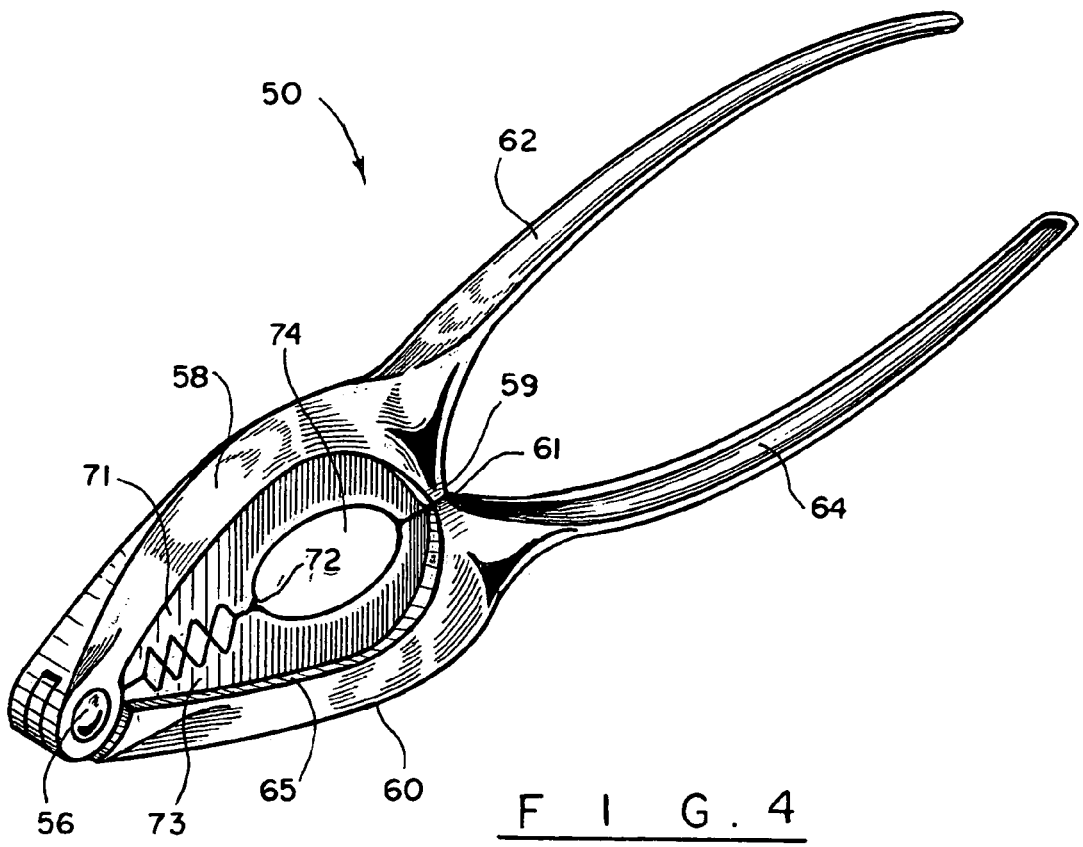
FIG. 4 is a perspective view of the shell-opening utensil in accordance with the second embodiment of the present invention in a closed position.

Turning now to the second embodiment of the device of the present invention shown in FIGS. 3 and 4, the utensil for opening the crustacean shell is generally designated by numeral 50. The device 50, similarly to the device 10, comprises a pair of elongate members 52, 54 that are joined together by a pivot pin 56 secured between head portions 58. 60. The handle portions 62, 64 of the elongate members 52 and 54, respectively, are unitary connected to their respective head portions 58, 60, and inwardly extending parts 59, 61 join together when the utensil is in a closed position shown in FIG. 4.

Similarly to the utensil 10, the head portions 58 and 60 are each provided with a groove 65 formed in the inner surfaces. Fitted in the grooves 65 are cutting blade members, or blades 66, 68. The blades 66 and 68 are mirror images of each other; each blade has a concave main blade part 67, 69, respectively, and a concave secondary blade part 71, 73, respectively. Each blade 66 and 68 has a sharpened inner surface or edge to facilitate cutting of the crustacean shell therewith. The sharp edges allow the user to more easily cut the shell as compared to blunt shell cracking device conventionally used for the purpose of shell cracking.

A plurality of sharp serrated teeth 70 is formed along the inner edge of the blade parts 71, 73. The teeth 70 are oppositely aligned, such that the tips or apexes of the teeth 70 contact each other when the utensil 50 is a closed position (FIG. 4). The main parts 67, 69 of the blades 66, 68 are sharpened but are free from the serrated teeth. The user has a choice of either performing a cut using the blade main parts 67, 69 or using the teeth 70 in severing the crustacean shell along a designated line.

A bridge 72 between the main blade parts 67, 69 and secondary blade parts 71, 73 is formed by inwardly curving blade portions 67, 69. A main opening 74 is formed by the main blade parts 67, 69; the opening 74 has a generally oval configuration. A secondary opening is formed between the secondary blade parts 71, 73. The secondary opening is narrow and is substantially closed when the handles 62, 64 are pivoted close together, such that only gaps between the teeth 70 remain. The bridge 72 separates the main opening 74 from the secondary opening. The main opening 74 has a greater size in comparison with the secondary opening for cutting different size shells.

Figure 5:
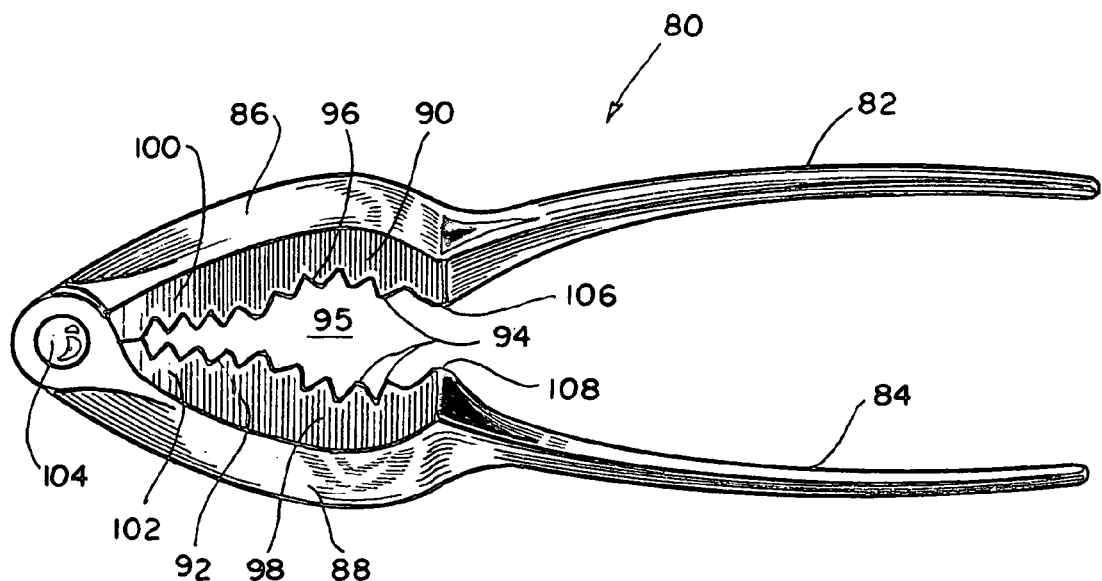
FIG. 5 is a perspective view of the shell-opening utensil according to the third embodiment of the present invention in an open position.
Figure 6:
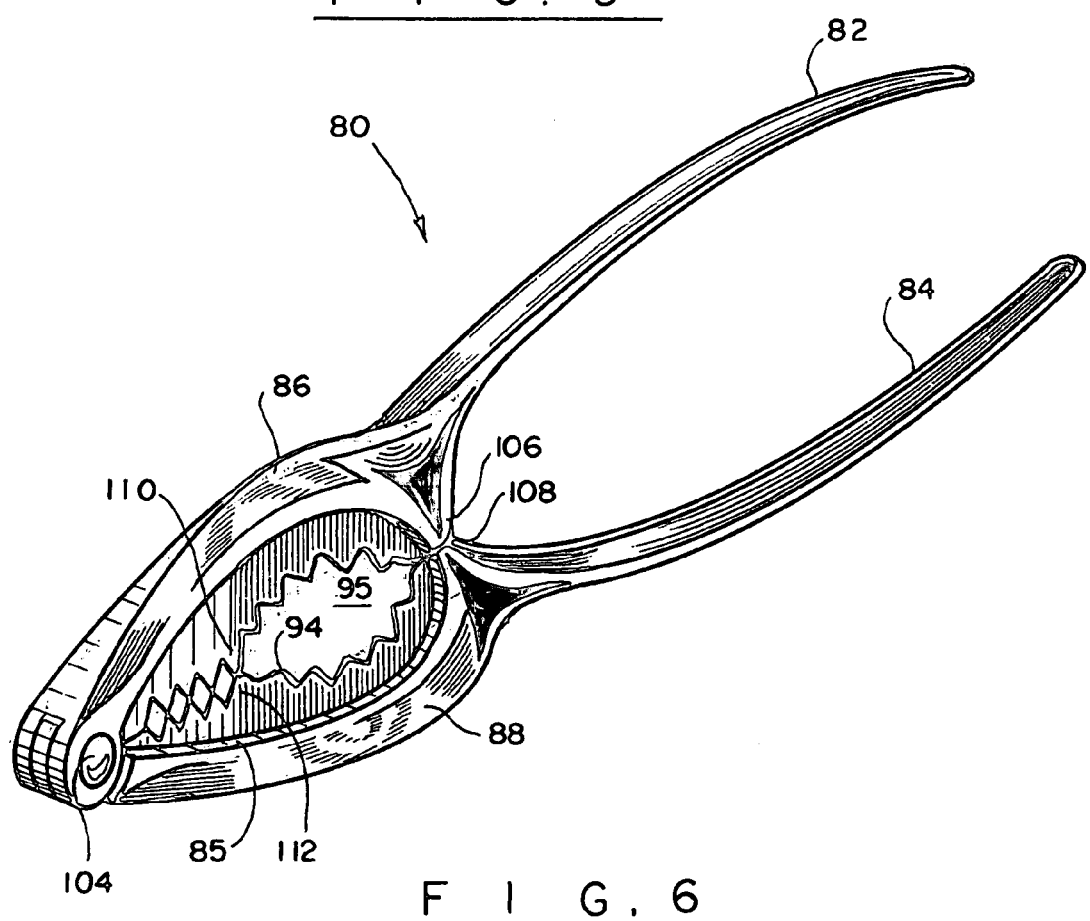
FIG. 6 is a perspective view of the shell-opening utensil in accordance with the third embodiment of the present invention in a closed position.

FIGS. 5 and 6 illustrate the third embodiment of the device of the present invention. The utensil body is generally designated by numeral 80. Similarly to the devices 10 and 50, the device 80 comprises a pair of elongate members with handle portions 82, 84 and head portions 86, 88. Similarly to the embodiments of FIG. 1-4, each of the head portions 86, 88 is provided with grooves 85. Cutting blades 90, 92 are fitted within the grooves 85, and each cutting blade is provided with sharpened serrated teeth 94 extending substantially along entire length of the blades' inner edges.

Similarly to the tool 50, the blades 90 and 92 define a main cutting area, or main opening 95 defied by concave blade parts 96 and 98 that are spaced from each other and form a generally oval opening. The secondary opening is defined by the blade parts 100, 102, where the distance between the facing teeth 94 is smaller in comparison to the distance between the teeth 94 of the blade parts 96, 98. The distance of separation between facing main blade parts 96, 98 and secondary blade parts 100, 102 is determined by the thickness of average crustacean shells so that the shell may easily be placed between the blades 96, 98.

The main opening 95 is sized to accommodate larger crustacean shells, for instance a crab or lobster leg, while the secondary opening is sized to accommodate smaller size crustacean shells, for instance snow crab legs. Similarly to the second embodiment, the handle portions have inwardly extending parts 106, 108 that help define the main opening 95. A bridge between the main opening and the secondary opening is also defined by inwardly curving parts 110, 112 of the cutting blades 96, 98, respectively.

The pivot pin 104 allows the handle portions 82, 84 and the head portions 86, 88 move towards and away from each other. The length of the handle portions 82, 84 is selected to be comfortable for a user to grip the handle portions in his or her hand and be able to exercise a reasonable degree of control over the pivotal movement of the head portions 86, 88 so as to cut through the shell of the crustacean but not the meat inside.

Figure 9:
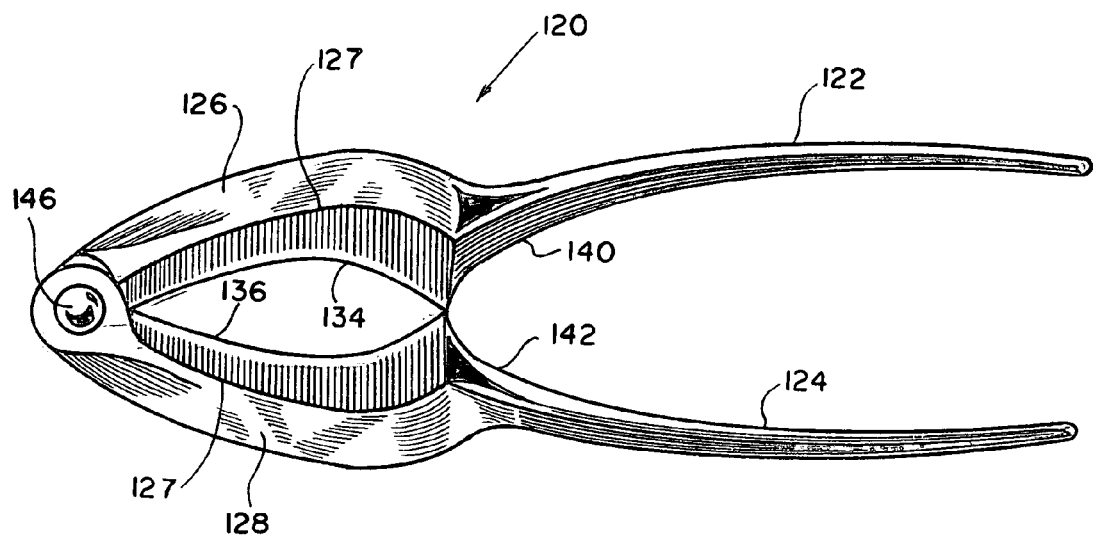
FIG. 9 is a front view of the fifth embodiment of the shell-opening utensil in accordance with the present invention in a closed position.
Figure 10:
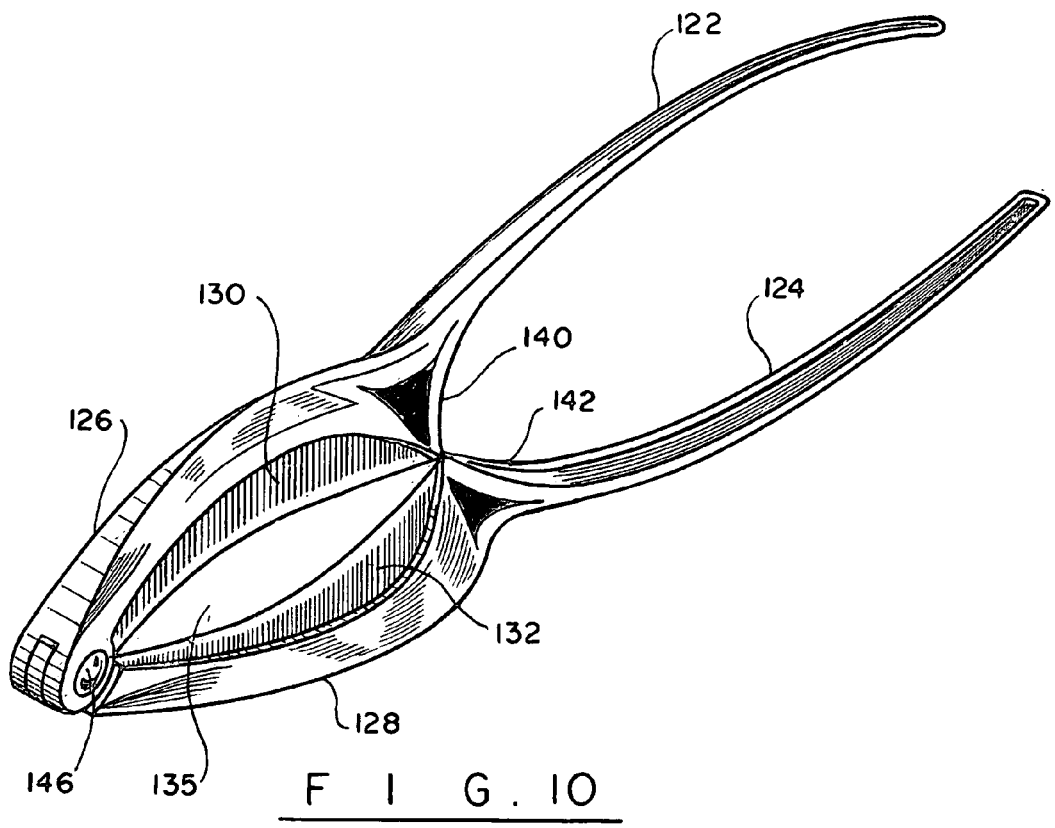
FIG. 10 a perspective view of the shell-opening utensil in accordance with the fifth embodiment of the present invention in a closed position.

Turning now to the fourth embodiment of the present invention shown in FIGS. 9 and 10, the utensil body is generally designated by numeral 120. Similarly to the devices 10, 50 and 80, the device 120 comprises a pair of elongate members with handle portions 122, 124 and head portions 126, 128. Similarly to the embodiments of FIG. 1-6, each of the head portions 126, 128 is provided with grooves 127. Cutting blades 130, 132 are fitted within the grooves 127, and each cutting blade is provided with sharpened edge 134, 136, respectively extending substantially along entire length of the blades' inner edges.

The blades 130 and 132 define a main cutting area, or main opening 135 defied by concave blade inner edges 134, 136 that are spaced from each other and form a generally oval opening. The distance of separation between facing sharp inner edges 134, 136 is determined by the thickness of average crustacean shells so that the shell may easily be placed between the blades 130, 132.

Similarly to the previously-described embodiments, the handle portions 122, 124 have inwardly extending parts 140, 142, respectively, that help define the main opening 135. A pivot pin 146 allows the handle portions 122, 124 and the head portions 126, 128 move towards and away from each other. The length of the handle portions 122, 124 is selected to be comfortable for a user to grip the handle portions in his or her hand and be able to exercise a reasonable degree of control over the pivotal movement of the head portions 126, 128 so as to cut through the shell of the crustacean but not the meat inside.

FIGS. 7 and 8 illustrate the fifth embodiment of the device of the present invention. The utensil body is generally designated by numeral 160. Similarly to the devices 10 and 50, the device 160 comprises a pair of elongate members with handle portions 162, 164 and head portions 166, 168. Similarly to the embodiments of FIG. 1-4, each of the head portions 166, 168 has a generally concave inner part, which is provided with a groove 165. Cutting blades 170, 172 are fitted within the grooves 165, and each cutting blade is provided with sharpened serrated teeth 174 extending substantially along entire length of the blades' inner edges.

Similarly to the tool 50, the blades 170, 172 define a main cutting area, or main opening 175 defied by curved blade parts 176, 178 that are spaced from each other and form a generally oval opening. A secondary opening 179 is defined by the blade parts 180, 182, where the distance between the facing teeth 174 is smaller in comparison to the distance between the teeth 174 of the blade parts 176, 178. If desired, the teeth of the blade parts 180, 182 can be made smaller. The distance of separation between facing main blade parts 176, 178 and secondary blade parts 180, 182 is determined by the thickness of average crustacean shells so that the shell may easily be placed between the blades 170, 172.

The main opening 175 is sized to accommodate larger crustacean shells, for instance a crab or lobster leg, while the secondary opening 179 is sized to accommodate smaller size crustacean shells, for instance snow crab legs. Similarly to the second embodiment, the handle portions have inwardly extending parts 184, 186 that help define the main opening 175. A bridge between the main opening and the secondary opening is also defined by inwardly curving parts 190, 192 of the cutting blades 170, 172, respectively.

A pivot pin 194 is fitted between converging parts of the head portions 166, 168 to allow the handle portions 162, 164 and the head portions 166, 168 move towards and away from each other. The length of the handle portions 162, 164 is selected to be comfortable for a user to grip the handle portions in his or her hand and be able to exercise a reasonable degree of control over the pivotal movement of the head portions 166, 168 so as to cut through the shell of the crustacean without imparting any substantial mechanical damage to the meat inside.

In use, a person grips the handle portions with one hand, and places a crustacean between the blades, either in the main opening or a secondary opening, depending on the shell size. The user then manipulates the handle portions relative to the shell of the crustacean so that the shell is cut or severed along a cut line, which is substantially a continuous line. The bridge between the inwardly curving parts of the blades can be used for cutting through the crustacean shells, whose size is large than the secondary opening.

The user can simply puncture the thin shell and cut through the shell wall with the blade sharpened edge, while the serrated teeth resist slipping of the shell under the blade. Alternatively, the sharp serrated teeth form a "perforated" cut line made of spaced punctured openings that are caused by spaced serrated sharp teeth to assist the user when breaking the shell of the crustacean. The user can then make a clean break along the punctured openings line to gain access to the crustacean meat.

The user can easily stop the squeezing motion on the handle portions as soon as the user detects that the shell has been cut. Since the meat of the crustacean would offer a different resistance to the cutting blades, the user can prevent damage to the meat by terminating the squeezing action on the handle portions. The inwardly extending handle parts will effectively stop the squeezing motion on the handle portions once the handle parts 19 and 21 (or 59, 61, or 106, 108) come into contact with one another.

Once the shell has been cut along the cut line, the user can remove the cut portion of the shell, exposing the meat for consumption. Depending on the location of the cut line, the user can remove a large or small portion of the crustacean meat from the shell. The handle portion 18 and the head portion 22 (similarly to the handle portion 52 with the head portion 58, handle portion 82 with the head portion 86) can be integrally constructed as one piece. The handle portion 20 and the head portion 24 (handle portion 64 with head portion 60; handle portion 84 with head portion 88) can also be integrally constructed as one piece. The devices 10, 50 and 80 can be made of a durable, non-corrosive material, such as stainless steel, aluminum and the like. The utensil of the present invention can be washed and sanitized in the same manner as other table utensils. The exemplary embodiment shown in the drawings, illustrates the head portions having outwardly convex outer surfaces. Of course, the outer surface can be formed planar, if desired.

If desired, the cutting blades in the utensil in accordance with the present invention can be detachably mounted in their respective head portions and changed if they become damaged or blunted. FIG. 9 and 10 provide an alternative to using a geometric shape of the double-concave blades of FIG. 3-6 by using continuously curving blades, which form one opening between the head portions. Still another alternative is to have the openings for receiving a shelled crustacean to be approximately same size. Still further alternative would be to have the openings formed not as generally oval openings shown in FIG. 3-6 but more round openings, covering more surface area of the crustacean shell.

The handle portions may be formed as cylindrical bodies, either solid or hollow. The length of the handle portions is selected to reduce strain on the hand of the user when cutting through the crustacean shell. If desired, the exterior surface of the handle portions may have a friction-increasing cover to facilitate gripping of the handle portions by the user.

Many other changes and modifications can be made in the design of the present invention without departing from the spirit thereof. I therefore pray that my rights to the present invention be limited only by the scope of the appended claims.

I claim:

1. A device for opening a shell of a crustacean, comprising:
a first elongated rigid member having a first handle portion and a first head portion secured to the first handle portion;
a second elongated rigid member having a second handle portion and a second head portion secured to the second handle portion, the first elongated rigid member being pivotally connected to the second elongated rigid member, and wherein each of said first head portion and said second head portion is provided with a groove on an inner surface thereof, and wherein a cutting blade means with a sharp contact edge is fitted in each said groove for engaging a shelled crustacean therebetween and for cutting through the crustacean shell, each of said cutting blades means being provided with sharp serrated teeth located on at least a portion thereof.

2. The device of claim 1, wherein a cutting blade means of the first elongated rigid member and a cutting blade means of the second rigid member have mutually opposing concave sharp inner edges forming mirror images of each other.

3. The device of claim 2, wherein said first elongated member and said second elongated member are capable of moving between a first open position and a second closed position, and wherein a sharp inner edge of the cutting blade means of the first head portion and a sharp inner edge of the cutting blade means of the second head portion are spaced from each and define a generally oval opening when the first elongate member and the second elongate member are moved to a closed position.

4. The device of claim 1, wherein said first head portion and said second head portion each have a generally concave inner surface.

5. The device of claim 1, wherein said cutting blade means comprises a blade member having a first concave blade part, a second concave blade part, and an inwardly extending intermediate blade part formed between the first concave blade part and the second concave blade part.

6. The device of claim 5, wherein serrated sharp teeth are disposed along at least the first concave blade part.

7. The device of claim 5, wherein serrated sharp teeth are disposed along at least the second concave blade part.

8. The device of claim 5, wherein serrated sharp teeth are disposed along the first concave blade part and the second concave blade part.

9. The device of claim 1, wherein said cutting blade means comprises a generally flat blade member.

10. The device of claim 9, wherein said flat blade member is provided with serrated sharp teeth disposed along substantially entire length of an inner edge of the flat blade member.

11. The device of claim 1, further comprising a pivot pin, which extends through respective openings formed in the first head portion and the second head portion.

12. A device for opening a shell of a crustacean, comprising:
   a first elongated rigid member having a first handle portion and a first head portion secured to the first handle portion;
   a second elongated rigid member having a second handle portion and a second head portion secured to the second handle portion, the first elongated rigid member being pivotally connected to the second elongated rigid member; and wherein each of said first head portion and said second head portion being provided with a groove extending along an inner edge thereof, and wherein a cutting blade means for cutting through a crustacean shell is detachably fitted in each of said grooves, said cutting blade means comprising a blade member having a sharp contact cutting edge with serrated teeth disposed along at least a portion thereof said teeth capable of forming a plurality of spaced punctured openings in the shell of a crustacean without imparting any substantial mechanical damage on crustacean meat.

13. The device of claim 12, wherein the blade members of the first head portion and the second head portion are configured as mirror images of each other.

14. The device of claim 12, wherein said first head portion and said second head portion each have a generally concave inner surface.

15. The device of claim 12, wherein said cutting blade means comprises a blade member having a first concave blade part, a second concave blade part, and an inwardly extending intermediate blade part formed between the first concave blade part and the second concave blade part, and wherein serrated sharp teeth are disposed along at least the first concave blade part.

16. The device of claim 15, wherein serrated sharp teeth are disposed along at least the second concave blade part.

17. The device of claim 15, wherein serrated sharp teeth are disposed along the first concave blade part and the second concave blade part.

18. The device of claim 12, wherein said cutting blade means comprises a generally flat blade member.

19. The device of claim 18, wherein said flat blade member is provided with serrated sharp teeth disposed along substantially entire length of an inner edge of the flat blade member.

20. A method of opening a shell of a crustacean, comprising the steps of:
   providing a first elongated rigid member having a first handle portion and a first head portion secured to the first handle portion;
   providing a second elongated rigid member having a second handle portion and a second head portion secured to the second handle portion, and pivotally connecting the first elongated rigid member to the second elongated rigid member;
   providing a cutting blade means secured on an inner surface of each of said first head portion and said second head portion for cutting a crustacean shell, said cutting blade means comprising a cutting blade member with sharp inner edge having sharp teeth located on at least a portion thereof;
   positioning a shelled crustacean between the cutting blade member of the first head portion and the second head portion;
   moving the handle portions towards each other, thereby causing the sharp teeth of the cutting blade member to contact the shell of a crustacean and cut through the shell, thereby severing the shell along a selected cut line without imparting any substantial mechanical damage to crustacean's meat.

21. The method of claim 20, wherein the selected cut line is substantially uniformly straight line through the shell of a crustacean.

22. The method of claim 20, wherein an inner edge of each of said cutting blade member carries sharp serrated teeth.

23. The method of claim 22, wherein said cut line is defined at least in part by a plurality of punctured openings formed by the serrated teeth.

24. The method of claim 22, wherein said blade member has a first concave blade part, a second concave blade part, and an inwardly extending intermediate blade part formed between the first concave blade part and the second concave blade part, and wherein the sharp serrated teeth are disposed along at least on the first concave blade part.

25. The method of claim 24, wherein serrated sharp teeth are disposed along the first concave blade part and the second concave blade part.

26. The method of claim 20, wherein said blade member has a first concave blade part, a second concave blade part, and an inwardly extending intermediate blade part formed between the first concave blade part and the second concave blade part, and wherein the sharp serrated teeth are disposed along at least on the second concave blade part.

27. The method of claim 20, wherein said cutting blade means comprises a generally flat blade member.

28. The method of claim 27, wherein said flat blade member is provided with serrated sharp teeth disposed along substantially entire length of an inner edge of the flat blade member.

29. The method of claim 20, wherein said the first concave blade part of the first head portion is substantially a mirror image of the first concave blade part of the second head portion.

* * * * *